(12) United States Patent
Martin et al.

(10) Patent No.: US 7,047,219 B1
(45) Date of Patent: May 16, 2006

(54) TRADE FINANCE AUTOMATION SYSTEM

(75) Inventors: Robert S. Martin, Mill Valley, CA (US); John G. Olsen, San Francisco, CA (US)

(73) Assignee: Trade Finance Systems, Inc., San Francisco, CA (US)

( * ) Notice: Subject to any disclaimer, the term of this patent is extended or adjusted under 35 U.S.C. 154(b) by 0 days.

(21) Appl. No.: 09/412,042

(22) Filed: Oct. 4, 1999

(51) Int. Cl.
*G06F 17/60* (2006.01)
(52) U.S. Cl. .............................. 705/37; 705/37; 705/30
(58) Field of Classification Search ............. 705/30–40
See application file for complete search history.

(56) References Cited

U.S. PATENT DOCUMENTS

| | | | |
|---|---|---|---|
| 4,752,877 A | 6/1988 | Roberts et al. ............. 364/408 |
| 5,220,500 A | 6/1993 | Baird et al. ................. 364/408 |
| 5,530,848 A * | 6/1996 | Gilbert et al. .............. 395/600 |
| 5,550,734 A | 8/1996 | Tarter et al. ................ 364/401 |
| 5,694,552 A | 12/1997 | Aharoni ...................... 395/237 |
| 5,717,989 A * | 2/1998 | Tozzoli et al. ................ 705/37 |
| 5,732,400 A * | 3/1998 | Mandler et al. ............... 705/26 |
| 5,873,066 A * | 2/1999 | Underwood et al. ........... 705/4 |
| 5,884,274 A | 3/1999 | Walker et al. ................. 705/4 |
| 6,073,104 A * | 6/2000 | Field ............................... 705/1 |
| 6,119,093 A * | 9/2000 | Walker et al. ................. 705/4 |
| 6,122,622 A * | 9/2000 | Wiitala et al. ................ 705/28 |
| 6,151,588 A * | 11/2000 | Tozzoli et al. ................ 705/37 |

FOREIGN PATENT DOCUMENTS

WO WO 94/09430 * 4/1994

OTHER PUBLICATIONS

Johnson, Thomas, "Accounts Receivable Financing" system, Internal Auditing v6n2, PP:61-63, Fall 1990, ISSN: 0897-0378, dialog file 15, Accession No. 00520582.*
Moynihan, James, *EDI Savvy Software Supports Accounts Payable and Accounts Receivable*, Apr. 1998, Healthcare Financial Management.

* cited by examiner

*Primary Examiner*—Frantzy Poinvil
(74) *Attorney, Agent, or Firm*—Michael A. Glenn; Glenn Patent Group

(57) ABSTRACT

A trade finance automation system includes an accounts receivable database receiving and storing invoices issued by one or more prescribed vendors for sales made to specified buyers. A credit limits database contains various credit limits applicable to buyers' accounts receivables that are subject to existing third party financing, the credit limits dictated by factors including terms of said third party financing. A credit limits tester performs substantially real time checking of buyers' invoices in the accounts receivable database to ensure compliance with the credit limits set forth in the credit limits database for said buyers.

2 Claims, 6 Drawing Sheets

TRADE FINANCE AUTOMATION SYSTEM

BACKGROUND OF THE INVENTION

1. Technical Field

The present invention relates to business models for managing foreign and domestic accounts receivable, and more specifically to client/server multi-user trade finance systems that assist manufacturers, traders and exporters in providing key trade finance information to financial institutions, credit insurance underwriters, insurance brokers and entities involved in the securitization of trade receivables.

2. Description of the Prior Art

The international markets for United States manufacturers, traders, and exporters have grown tremendously in recent years, and this growth has principally been fueled by new technology. Such growth has also included the development of new and varied distribution channels. All of this has placed a great strain on existing finance methods and departments to deal with accounts-receivable problems. Foreign and domestic buyers insist that manufacturers, traders and exporters sell products to them on open account receivables terms. Original equipment manufacturers (OEM's), distributors, and resellers are also seeking extended payment terms to allow themselves enough time to install and collect from the end user before having to pay the manufacturer.

New systems are needed that can reduce the credit exposure to foreign and domestic buyers, accelerate cash flow, improve and manage balance sheet efficiency ratios, etc. Requests for extended payment terms need to be accommodated, while avoiding high credit exposure, increased days sales, outstanding (DSO) and the offering of excessive cash discounts to accelerate collections. Such improved systems would be used to facilitate revenue recognition, and provide an overall increase in the return-on-capital.

Credit insurance can be used as a source of repayment for the purchase/financing of accounts receivable. But such requires that accurate and timely information be provided by manufacturers, traders, and exporters that includes routine periodic reports and useful historical data. Management systems need to properly track and control large numbers of insured open accounts receivable. It would be beneficial if the manufacturers, traders, and exporters had systems that would allow them to function as the financial institutions' collection agent. Such necessitates the ability to properly monitor, segregate, and quickly remit collected funds. Seeing how much of the committed insurance/credit limit capacity has been used according to policy, country, buyer, and other parameters established by the credit insurer and/or financial institution can also facilitate financing and claims processing.

SUMMARY OF THE INVENTION

A trade finance automation system includes an accounts receivable database receiving and storing invoices issued by one or more prescribed vendors for sales made to specified buyers. A credit limits database contains various credit limits applicable to buyers' accounts receivables that are subject to existing third party financing, the credit limits dictated by factors including terms of said third party financing. A credit limits tester performs substantially real time checking of buyers' invoices in the accounts receivable database to ensure compliance with the credit limits set forth in the credit limits database for said buyers.

DETAILED DESCRIPTION OF THE INVENTION

Figure 1:
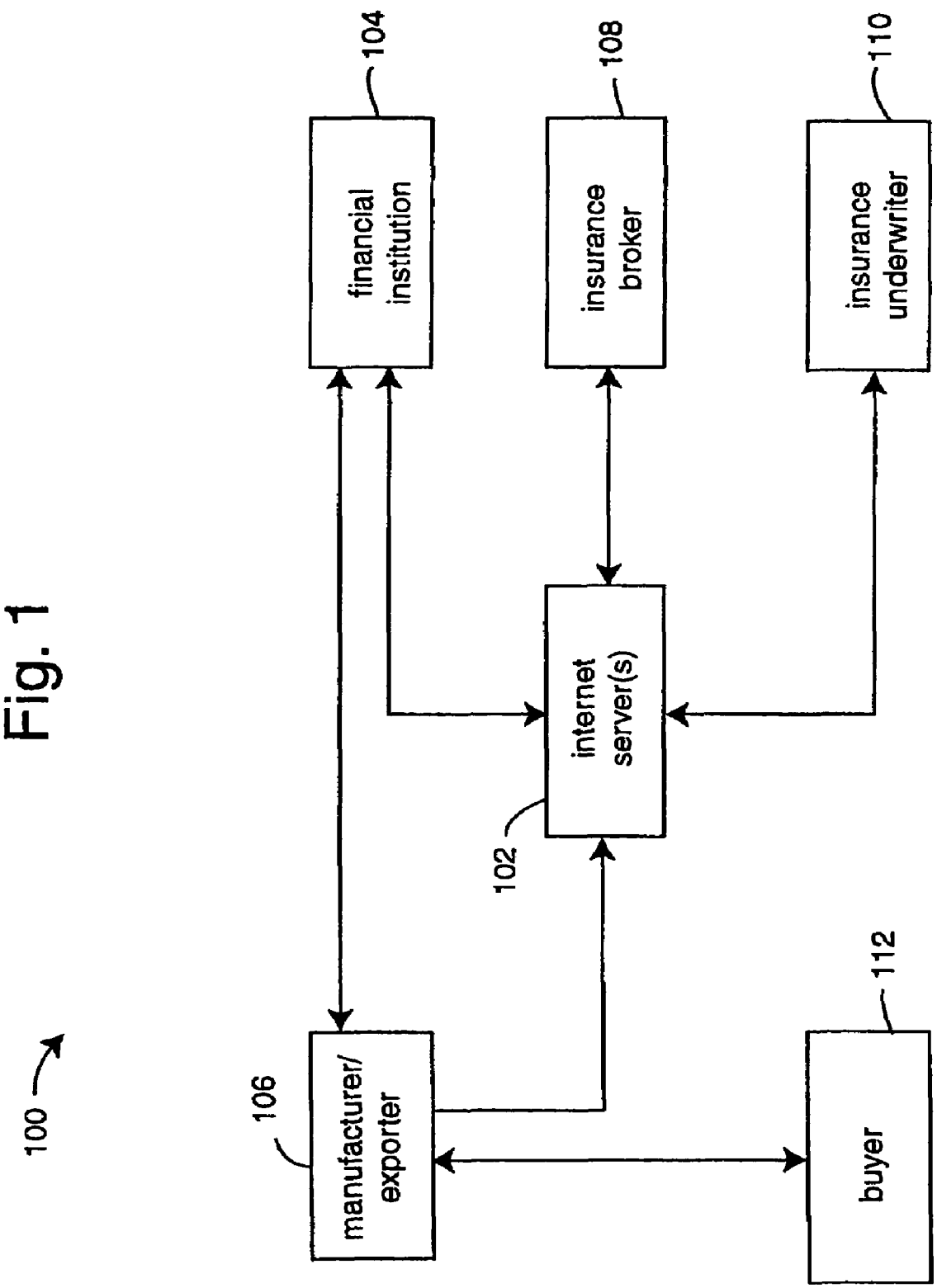
FIG. 1 is a flowchart for a system embodiment of the present invention that includes an integrated software program used to monitor and track all aspects of the short-term export and domestic open accounts receivable process according to the invention.

FIG. 1 is a flowchart for a system embodiment of the present invention that includes an integrated software program used to monitor and track all aspects of the short-term export and domestic open accounts receivable process, and is referred to herein by the general reference numeral 100. System 100 provides for tracking of shipments, invoices, payments and remittances. It monitors manufacturer credit, buyer limits, country limits and other insurance policy/financing terms. It can determine the eligibility of receivables for financing or purchase by financial institutions. System 100 enforces realtime compliance with predetermined credit limits, insurance policies, financial institutions' financing agreements, and it can generate a variety of reports specific to the needs of manufacturers/traders/exporters, credit insurers/brokers, and financial institutions.

System 100 is organized around an Internet server that is operated by a service provider 102, e.g., Export Finance Systems, Inc. (San Francisco, Calif.). A bank 104 or other financial institution introduces the service provider 102, who operates the Internet server, to a manufacturer/trader/exporter 106. Such introduction may alternatively be made by an insurance broker 108 or an insurance underwriter 110. The manufacturer/trader/exporter 106 is characterized by its generation of accounts receivables to foreign or domestic customers 112 that require some form of receivables financing or credit insurance on some or all of its trade accounts. The financial institution 104, insurance broker 108, and insurance underwriter 110 are in the business of arranging and/or providing such receivables financing or credit insurance. Each of the business operations shown in FIG. 1 is typically independent of the other and are physically remote. The Internet is used as a communications tool to make the physical separation distances between them of no consequence.

In operation, the underwriter 110 and broker 108 determine the eligibility of the foreign or domestic customers 112 for a credit insurance policy. A commitment to the manufacturer/trader/exporter 106 is obtained from the underwriter 110 and a financing commitment is obtained from the financial institution 104. The commitment letter from the financial institution issued to the manufacturer/trader/exporter 106 agrees to purchase a specified amount of accounts receivable of approved buyers 112 both insured and uninsured. All such commitments are recorded at the Internet server 102. The manufacturer/trader/exporter 106 thereafter ships products or services to the buyers 112. The invoices are generated and collections activities of the manufacturer/trader/exporter 106 are done with computer programs that are run and maintained by the manufacturer/exporter on its own enterprise system. The invoice and collection data generated by the manufacturer/trader/exporter 106 is either manually or electronically inputted into the Internet server 102. Electronic input presently involves the inputting of data provided in various formats, sorting of such data, and processing of such data, such that the data are available to the system in a system format. In other embodiments of the invention, the data may be extracted directly from their source.

The system screens and flags which accounts receivable qualify for particular commitment letters and insurance policies. The manufacturer/trader/exporter 106 sells/finances the insured accounts receivable to the financial institution or bank 104. Each such account receivable selected for financing draws down the credit limit reserve maintained for each insurance policy, policy category or financial institution established credit limit. Each collection is used in realtime to free up the credit insurance or financial institution credit limit it corresponds to.

Hundreds, if not thousands of independent financial institutions 104, manufacturers/exporters 106, insurance brokers 108, insurance underwriters 110, and buyers 112 can be simultaneously serviced by a single Internet server 102 or cluster of servers 102. A per-use or subscription fee is charged by the Internet service provider 102 to one or more of the other participants.

The manufacturer/trader/exporter 106 logs onto the Internet server 102 to update and monitor status of all insured/eligible receivables, as well as specific receivables sold/financed with financial institutions. Reports can be generated on the Internet server 102 by all relevant parties. Each buyer 112 pays off the accounts receivable to the manufacturer/trader/exporter 106 acting as collection agent for the purchaser/financier of the accounts receivables. The manufacturer/trader/exporter 106 remits funds to financial institution 104.

Some or many of the functions provided by the Internet server 102 can be distributed out to the manufacturers/traders/exporters 106. The centralized system configuration is preferred in which each of the financial institutions 104, manufacturers/traders/exporters 106, insurance brokers 108, insurance underwriters 110, and buyers 112 use Internet browsers connected through their own Internet service providers (ISPs).

In the distributed system configuration, system 100 is a Microsoft WINDOWS-based PC multi-user trade finance system operating at the manufacturers'/traders'/exporters' site to provide the same key trade finance information to manufacturers/traders/exporters, financial institutions, credit insurance underwriters and insurance brokers. The system 100 in the distributed environment provides for users to perform work on their own computer systems and periodically update a central system through an Internet connection. This topology requires that a system user have a computer with access to the Internet.

Credit insurance policies vary depending on the insurance underwriter as well as the specific types and kinds of coverage required. However, there are general policy parameters that are common throughout all policies. The insurance policy is used to indemnify the insured for the insured percentage of the amount of a loss that is in excess of any applicable deductible arising from the failure of the buyer to pay the contract price of an insured transaction. The purpose of an accounts receivable tracking system is to test all the relevant parameters of each invoice to determine if that invoice is insured or uninsured or meets the buyer and credit requirements established by a financial institution. Each transaction is tested to see if it meets each of several different guidelines. For example, a buyer-limit test can check the total amount payable for all losses for a specified buyer. A country-limit test can check the total amount payable for all losses on all buyers in a specified country. A policy-limit test can check the specified dollar amount that represents the aggregate limit of liability of the insurance company. A ship-date test can check to assure the actual shipping date for the goods falls within the policy or financing agreement effective and expiration dates. A payment-terms test can check the maximum permitted number of open account days from the date of the invoice. A past-due test can check if the past due date or amount is exceeded. If so, subsequent invoices cannot be insured and/or financed.

Figure 2:
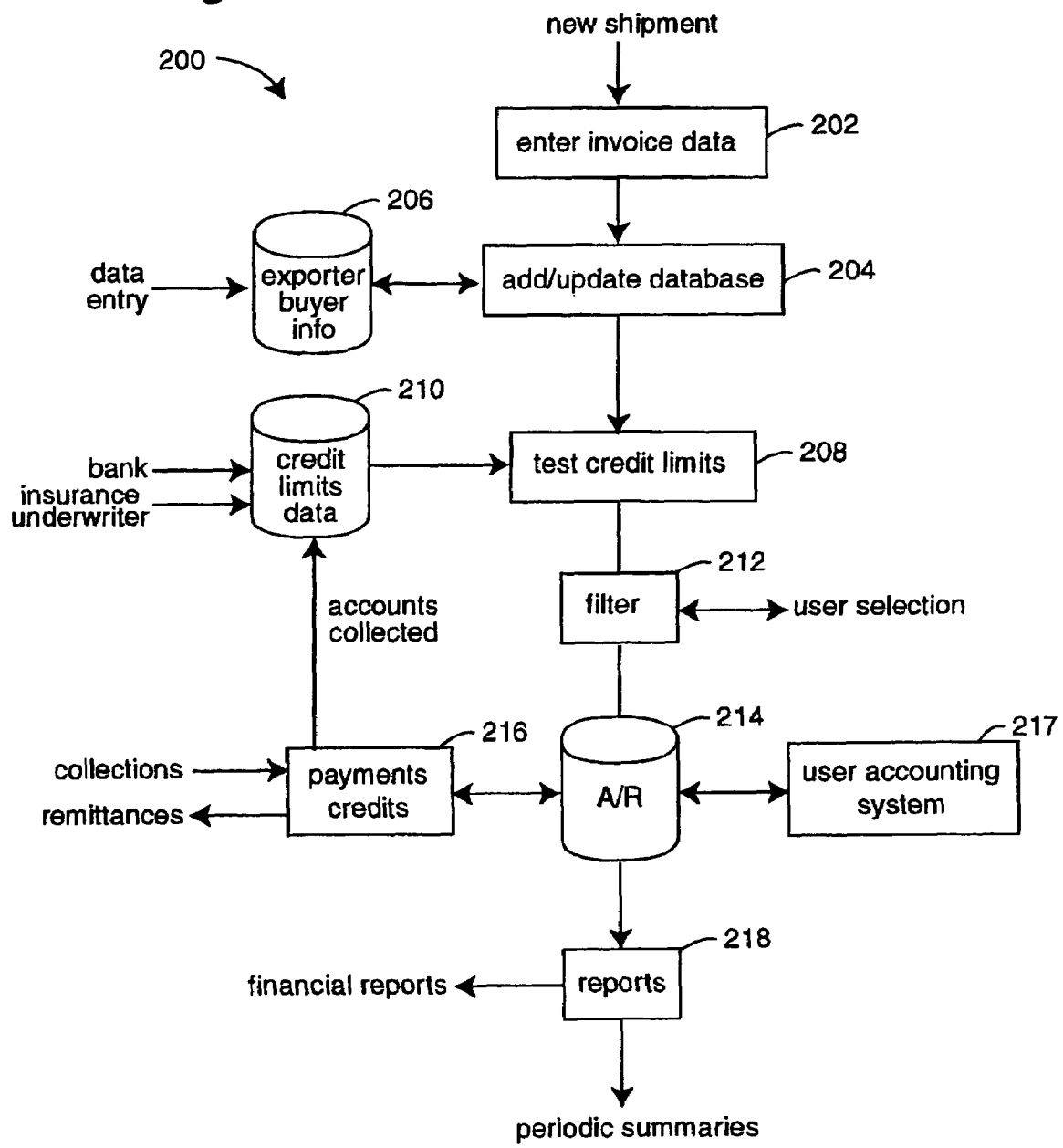
FIG. 2 is a flow diagram representing an accounts receivable finance system according to the invention that can be operated by computer on the Internet server utilized by the service provider of FIG. 1.

FIG. 2 represents an accounts receivable finance system 200 that can be operated by computer on the Internet server 102 (FIG. 1). The accounts receivable finance system 200 begins with new shipment information provided by a manufacturer or exporter. Such information is typically entered with a personal computer and a browser logged on though the Internet to the Internet server 102 (FIG. 1). A utility 202 allows the specific invoice data about the sale and shipment to be entered. Such information can be used in a utility 204 to update information in an exporter and buyer database 206. If the buyer information and elements of the shipment are already known, the exporter and buyer database 206 is used to add information to the invoice, e.g., fill in the blank boxes. A test of the credit limits associated with the particular buyer is done in a utility 208. A credit limits database 210 is used as a template. Such credit limits database 210 is built up from information included in the credit insurance underwriter's policy and the financial institution's commitment letter to provide credit to the manufacturer or exporter. A filter 212 is used by the manufacturer or exporter to select particular invoices for sale or financing from all those that seem to qualify. All invoices, selected or not, qualified for credit insurance or not, are stored in an accounts receivable database 214. As payments, collections, and credits come in over time, a utility 216 is used to update the corresponding accounts receivable in the database 214. Payments and credits are utilized by utility 216 so that the credit limits database 210 can be updated to immediately give back the credit reserve for use on new invoices. A user's accounting system 217 can be connected to the accounts receivable database so that invoice and payment information can be imported electronically into the accounts receivable database 214. A reports generator 218 is used to provide periodic summaries, and various reports to each interested party.

The exporter and buyer database 206 capture basic data about the exporter, e.g., general company information, company financial history, export sales experience and bank information. It also includes information about all of the exporter's major buyers. Such information includes general company information, sales experience, trade references, financial and credit information, etc. Once an insurance policy and/or financing agreement has been issued, the credit limits database 210 is used to store all of the relevant policy/financial institution information including general policy/financing agreement terms and limits, detailed manufacturer/trader/exporter limits, specific buyer limits, discretionary credit limits, special buyer credit limits, approved payment terms by buyer and country limits, etc. As shipments are made, the accounts receivable database 214 is updated to reflect invoice amount, shipment date, purchase order number, bill of lading information, invoice number, term and invoice date. As the required data of a shipment or invoice is entered into the system, the data is checked, monitored and tested to insure that all invoices meet the overall policy and financial institution terms and limits. Invoice totals are checked against the current outstanding balance and limit for each individual buyer. The entering of shipments or invoices captures information that is needed for the preparation of premium reports. The reports utility 218 preferably provides premium reporting, accounts receivable aging, past due invoices, activity reports, status of sold invoices, exporter credit limit, buyer credit limits, country credit limits, remittance reports, etc.

The payments and credits utility 216 is used to enter payments from buyers and other credit adjustments to their accounts. As new payments are entered, the system updates all of the related limits for both the manufacturer/trader/exporter and buyer so insurance capacity or credit limits are freed-up. Such capacity is made available to subsequent invoices on a first-in, first-out basis. This allows an invoice to now become insured/eligible which was previously uninsured/ineligible because the total outstanding to a particular buyer exceeded its limit.

Historical or realtime data for invoice and payment records can be entered manually or large amounts of data can be imported from a user's accounting software or mainframe 217 all at one time with an import utility function, e.g., to save time and reduce the possibility of errors. The selection of eligible invoices for sale or financing in utility filter 212 is used to select, flag and track those invoices that are eligible for sale or financing. Any of several filters enable the user to select only those invoices that meet certain criteria. The payments and credits utility 216 is used to record and track when collections on sold invoices are to be remitted to the financial institution. This capability assists in calculating the amount of interest earned by the purchaser/financier of the recievables and any possible rebate of interest due to the seller of the invoices.

The Internet provides an unprecedented level of accessibility and connectivity between users, thereby allowing users to keep their data up-to-date using the most efficient connection available, regardless of their current location.

The trade finance system can also be installed directly on a user's desktop computer or network. This distributed-type system is very responsive since the application resides on either the user's desktop computer or network, and the central data files can be replicated periodically via the Internet. Because system 200 can be run on the user's network, access to reports and other information in the system 200 is available to anyone with appropriate password authority at the client location. System 200 preferably provides for the electronic bulk import of data from the user's internal accounting system, which avoids time-consuming data reentry. Security can be provided through the use of password codes, data encryption and other security measures. The application used at client site can preferably be updated from a remote location.

User Interface

The control of each utility and database illustrated in FIG. 2 is preferably done through an associated graphical user interface (GUI), e.g., a browser display screen or window. An exporter and buyer information display screen preferably includes general and historical data about the exporter, the buyer parent and each of the buyers. Such screens are displayed from the administration section of a welcome screen, or main menu. The user typically enters this information once and updates it on a periodic basis, as needed.

A credits limits display screen includes critical data that forms the functional basis of system 200, so this data should only be entered or updated by personnel who understand the underlying concepts of the insurance policy/financing agreement and how it relates to each buyer. The edit functionality for these screens is preferably accessible at the highest manufacturer/trader/exporter security level only or directly inputted by the insurance underwriter, insurance broker, or financial institution via the Internet. Any original data or changes to the data entered into this display screen are supported by confirmation from the insurance underwriter and/or the financial institution.

The policy screen includes the basic policy/credit limit information such as policy number and insurer name. In addition, all the critical information regarding the policy/credit limits and the outstanding invoice totals are displayed here. The country limits screen includes the credit limit information for each country and the dollar amount of outstanding invoices. The buyer limits screen includes the credit limit information for each buyer entered into system 200 and the dollar amount of each buyer's outstanding invoices. This display screen preferably describes how to access the screens and enter, edit and delete policy, country and buyer limits information. Definitions for each field relating to insurance information are provided. All the information for this display screen is preferably found in the insurance policy.

The invoices display screens are preferably used to manually enter and edit shipment and invoice data for each insured buyer. The entry and edit functionality for these screens is preferably accessible at the operator security level.

The import menu provides functionality for importing large data files including the shipment and invoice information. This screen is preferably also accessible at the operator security level.

As invoices are entered into system 200, each key field is preferably tested against the appropriate parameters and limits of the insurance policy/financing agreement.

System 200 continually tests the limits as new invoices and payments are entered. An invoice that was uninsured/ineligible due to an over-limit situation can become insured/eligible at a later date as that condition is preferably eliminated.

This invoices display screen covers two screens: invoice entry and invoice editing. The import menu screens cover: new import, history and edit invoices.

The invoice entry screen is preferably a basic data entry screen for entering invoices manually. Once the data is preferably saved it automatically displays on the right half of the screen. This display allows users to keep track of the last invoice entered when inputting large quantities of invoice data.

The invoice editing screen allows users to make changes to saved invoice data. In addition, it displays invoice-related information regarding coverage test failures, customer payments and bank remittances.

A new import screen is preferably used for the setup screen for importing data files into system 200. A history screen allows the tracking of which files have been imported into system 200. The edit screens provide a way to review and correct any invoice or payment records that may have been rejected in the import process. This display screen preferably describes how to access these screens to manually enter, edit and delete shipment and invoice information and use the bulk import process. Although most fields are self-explanatory, descriptions and help screens are provided for most of the fields. The tab key is used to move through the fields. The text in blue are view-only fields.

The payment entry screen is preferably a data entry screen to enter cash receipts and adjustments to specific invoices that have been previously entered on the invoice entry screen. For example, credit memos, write-offs, discounts taken, etc. The entry and edit functionality for these screens is preferably accessible at the operator security level. Once the data is preferably saved or imported it automatically displays on the right half of the screen. This display allows users to keep track of the last invoice entered when inputting large quantities of invoice data.

A bulk import screen for payments preferably operates identically to the process for bulk invoices. An import edit screen for payments also provides the functionality for viewing and correcting errors in imported files.

A financing-sell invoices display screen is preferably used to select eligible invoices in system 200 for sale or financing and flag the invoices that have actually been sold. The functionality for this screen is preferably accessible at the supervisor security level only.

In one embodiment of the present invention, the system 200 selects for sale only insured/eligible invoices for all buyers. Partially insured/eligible or uninsured/ineligible invoices are not eligible for sale. When the date and amount criteria are entered in the designated fields, the corresponding invoices display with all their related information. Invoices can be reviewed and selected individually or a short cut key allows users to select all invoices at one time. This display screen preferably describes how to access the screen and select the invoices to sell or finance and create a report for the selected invoices. It also preferably describes how to edit the annual interest rate and sold date for batches of selected invoices.

A financing-remittance display screen is preferably used to enter remittances made to the financial institution that bought a selected invoice. An employee with an operator security level may enter remittances. The remittance entry screen is preferably a basic data entry screen for individual remittances. Once the data is preferably saved it automatically displays on the right half of the screen. This display allows users to keep track of the last invoice entered when inputting large quantities of invoice data. The bulk remittance screen provides a way to enter a remittance for quantities of sold invoices at one time. When the date and amount criteria are entered in the designated fields the corresponding invoices display with all their related information. Invoices can be reviewed and selected individually or a short cut key allows users to select all invoices at one time. This display screen preferably describes how to access each screen and select the invoices to remit to the financial institution. It also preferably describes how to edit the remit date for batches of selected invoices.

Reports

A reports display screen is preferably used to provide a wide-range of integrated and useful reports. The use of a relational database allows a series of queries to design reports providing invoice, credit limits and policy data. A display screen can be used to provide a brief description of each report. A list of preferred report types follows.

An invoice aging report uses an as of date to select and print a detail aged trial balance of all open accounts receivable. Invoices can be aged by due date or invoice date and aging can be selected on the following criteria: all outstanding invoices, all insured invoices or all sold invoices. Such report can also be selected by individual buyer or all buyers and can list in detail by buyer and exporter total and individual financial institutions or all financial institutions.

An invoice past due report shows all of the invoices in detail that are past due based on the past due date that is preferably calculated for each invoice in system 200. By specifying the date from which past dues are to be calculated, dollar amount threshold and the number of days past due, system 200 reports each past due invoice by buyer and the insured in total. This report is preferably used by the insurance underwriter, insurance broker and by the financial institution as well as by the insured.

An invoice activity report lists either in summary or in detail, by buyer, all of the new invoices entered and all cash receipts and credits applied between a specified beginning date and ending date. This report is preferably particularly useful in reconciling changes in account balances between periods.

An invoices sold report selects and prints a summary or in detail the current status of all invoices that have been sold on a specified date. An individual financial institution or all financial institutions can also be designated.

A remittance history report selects and prints a summary of all remittances for corresponding invoices that have been made on a specified date. An individual financial institution or all financial institutions can also be designated.

A remittance-detail report displays the amounts outstanding, the length of time outstanding, payments made and interest or discount earned for each sold invoice. Individual financial institutions or all financial institutions can also be designated.

A borrowing base report displays eligible outstanding accounts receivable that can be used as a borrowing base for a financial institution loan. No disputed or previously sold invoices are included, unless they have been bought back.

An exporter credit limits report can be selected by policy number and displays the current outstanding totals for all buyers covered under the insurance policy key, e.g., total invoices outstanding, total insured invoices outstanding, total uninsured invoices outstanding, total sold invoices outstanding, total uninsured invoices outstanding per books, and total sold invoices outstanding per financial institution.

A country credit limits report shows the outstanding balances of invoices by country and by buyer within each country. These amounts are relevant because in some cases the insurance policy/financing agreement places limits on a country by country basis.

A buyer credit limits report displays the current outstanding total for each individual buyer covered under the insurance policy and/or financing agreement and displays, e.g., approved buyer limit, limit expiration date, total invoices outstanding, total insured invoices outstanding, high credit, unused credit, uninsured invoices outstanding, sold invoices outstanding per books and sold invoices outstanding per financial institution.

A policy premium report calculates the insurance premium earned based on the premium rate defined under the insurance policy and lists in either summary or invoice detail. Such as, all of the shipments entered into system 200 for the time period defined on the premium reports screen, and a dollar value of the shipments.

System Architecture

Figure 3:
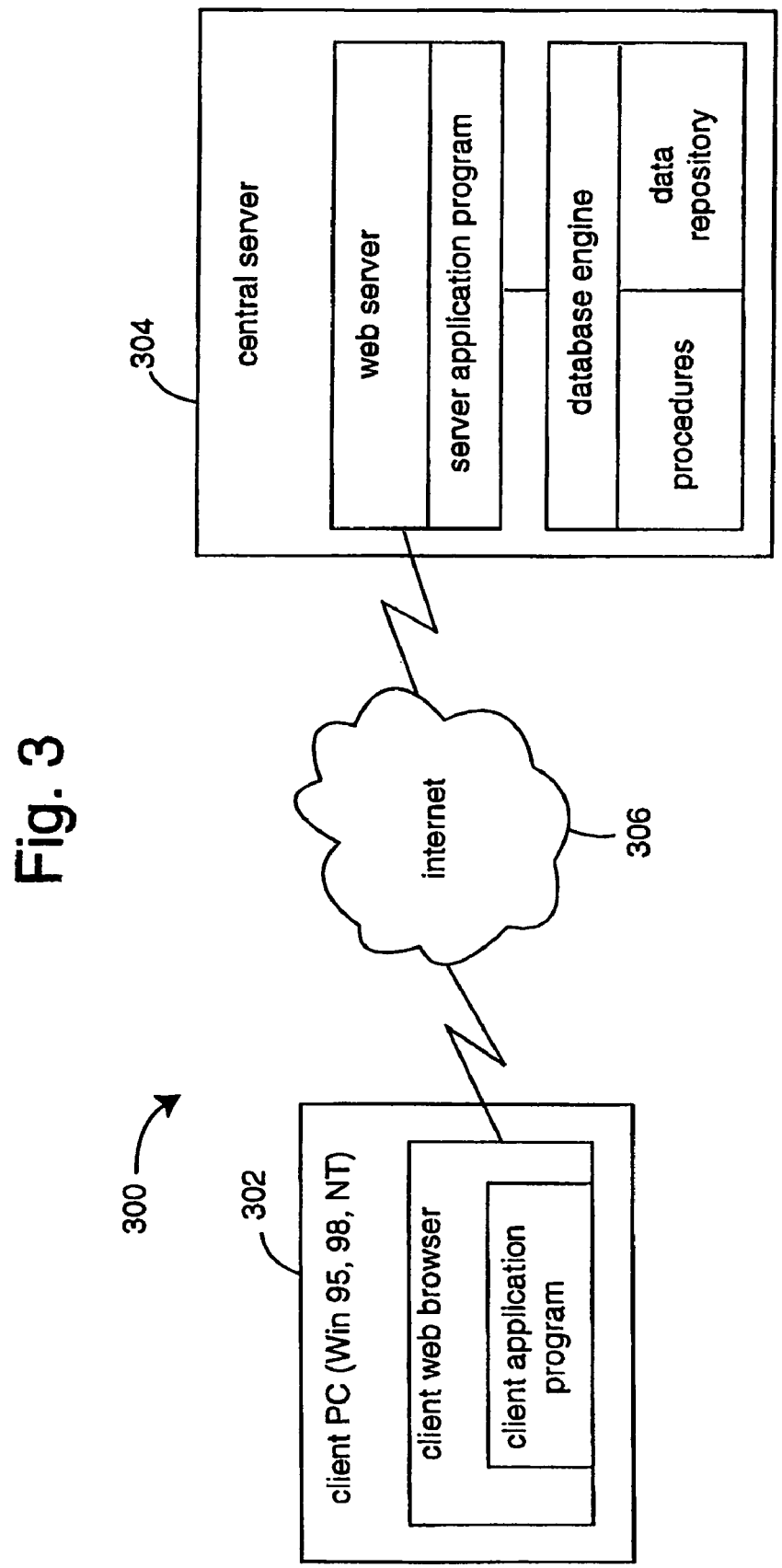
FIG. 3 is a block diagram of a centralized Internet server topology according to the invention for the system of FIG. 2.

FIG. 3 represents an Internet topology 300 for system 200 (FIG. 2). A user's PC 302 communicates with a centralized server 304 over an Internet connection 306.

The centralized server 304 is implemented with either UNIX or WINDOWS-NT running Web server software. The Internet server 304 contains three layers of services: a) client interaction management, b) business rules, and c) datastore services. A database engine functions as both a data store and to process transactions. Such database engine is preferred because it can easily be scaled from a single-user stand-alone system to a large scale clustered multiprocessor topology. Business rules can be implemented both in the database engine and as independent objects. A Web server provides client authentication and application launch services. These allow new versions of an interface program to be automatically downloaded from the centralized server 304 over an Internet connection 306.

A second main component is the client interface. The client interface uses a combination of HTML, browser-resident programs using ActiveX, Active Document, Java, or similar technical platforms and stand-alone utilities. The same code base will work with either the databases on a central server (FIG. 3) or on a stand-alone PC (FIG. 4).

Figure 4:
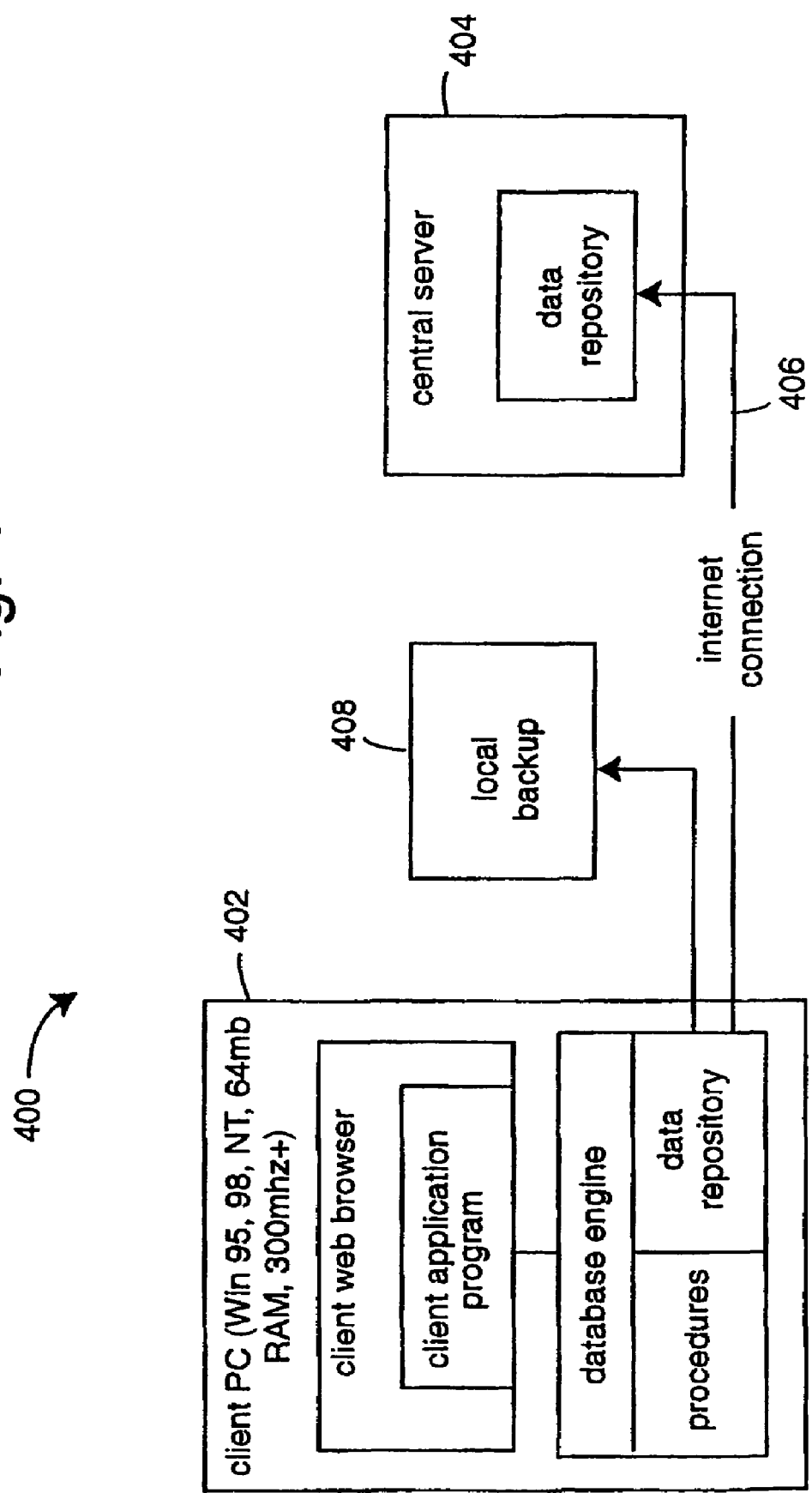
FIG. 4 is a block diagram of a single-user topology according to the invention for the system of FIG. 2.

FIG. 4 shows a single-user topology 400 for system 200 which allows clients to manage their data on-site and not on a central server. A database engine is installed on a users PC 402. A central server 404 can be used as a data repository. Client data can be uploaded to the central server 404 via Internet connection 406 and thereafter passed to financial institutions, insurance underwriters and insurance brokers. A local backup 408 is included.

Figure 5:
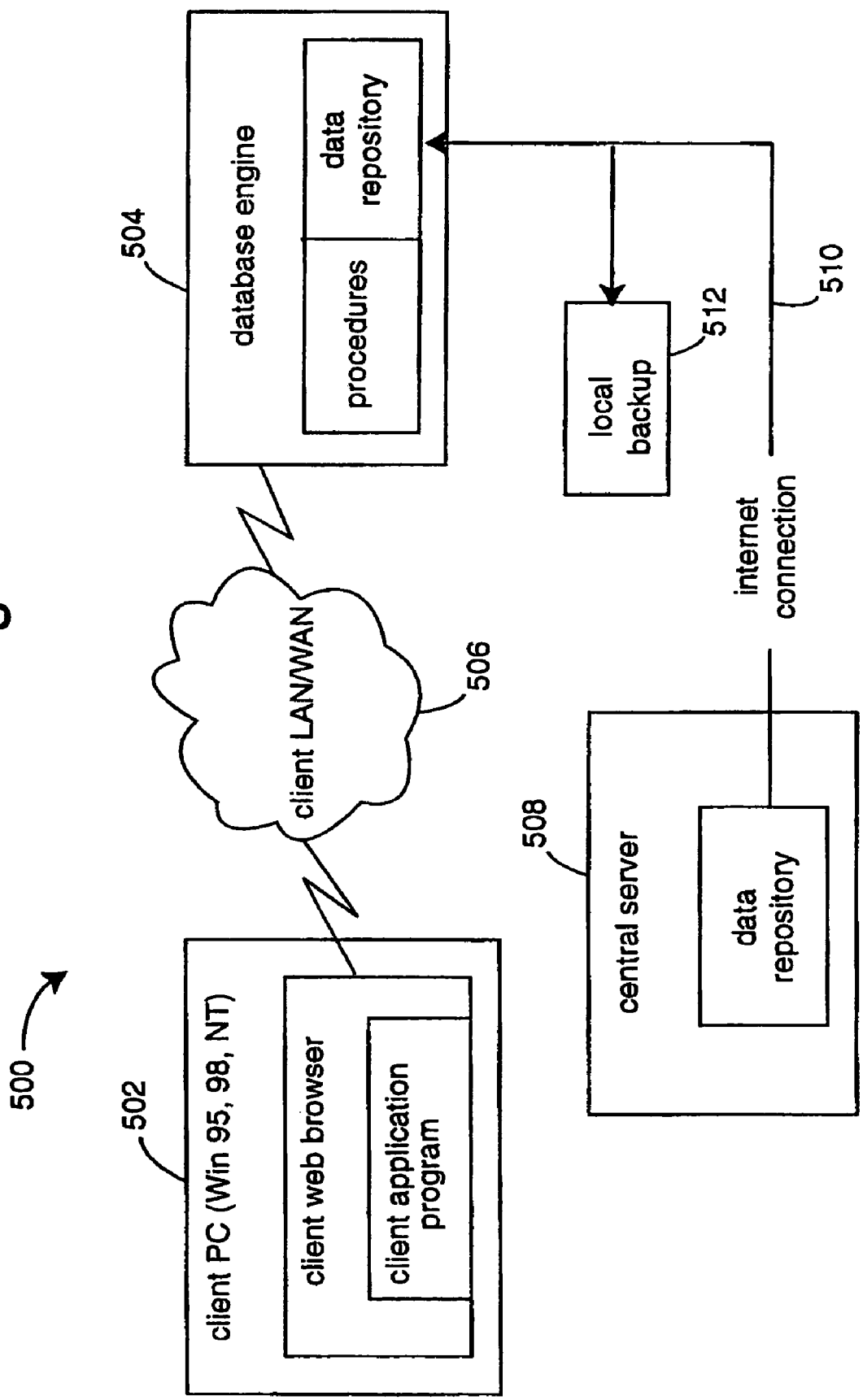
FIG. 5 is a block diagram of a mufti-user topology according to the invention for the system of FIG. 2.

FIG. 5 represents a multi-user topology 500 for system 200. A users PC 502 communicates with a client database engine 504 over a local area network (LAN) or wide area network (WAN) connection 506. A centralized server 508 can be used as a data repository and uses an Internet connection 510 that communicates over port-1433, for example. A local backup 512 is included. The client database engine 504 includes procedures and a private data repository.

Figure 6:
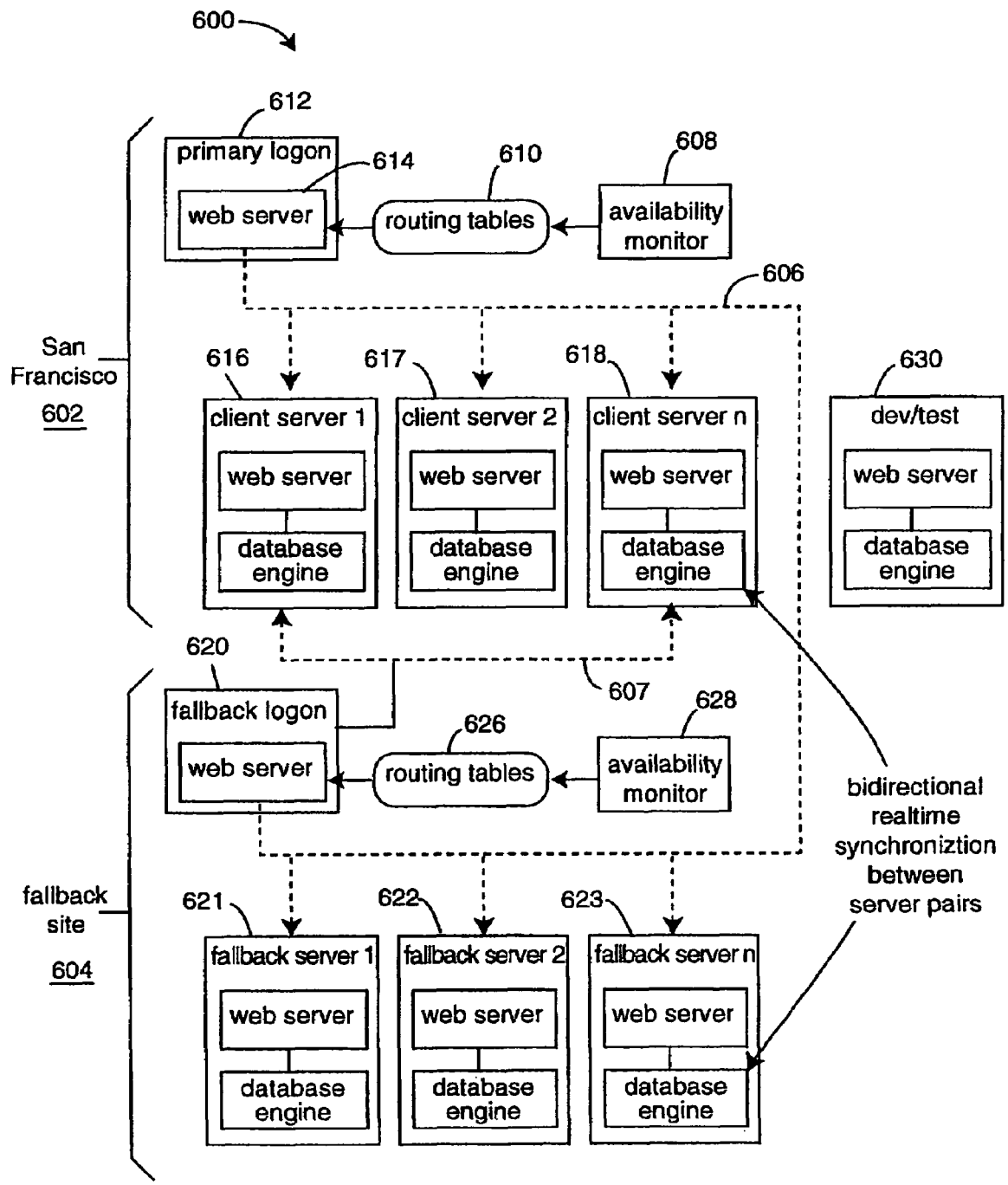
FIG. 6 is a block diagram of a high-availability central server topology that can be used for the system of FIG. 2.

FIG. 6 represents a high-availability central server topology 600 that can be used for system 200. At a primary Web location 602, e.g., San Francisco, is connected to a fall-back secondary location 604 via a point-to-point high speed connections 606 and 607. Data synchronization is constantly provided over such high speed connections 606 and 607. A web-site availability monitor 608 allows the adjustment of routing tables 610 associated with a primary logon web-site presence 612. A web-server 614 responds to client logons and directs traffic and interactions with one of several primary client servers 616–618 physically located nearby. A fall-back logon web-site presence 620 is physically associated with several fallback severs 621–623. The point-to-point high speed connection 606 allows the primary logon web-site presence 612 to directly access the fallback severs 621–623. The point-to-point high speed connection 607 allows the fallback logon web-site presence 620 to directly access the primary client severs 616–618. A fallback web-site availability monitor 628 allows the adjustment of routing tables 626 associated with the fallback logon web-site presence 620. A development and test center 630 includes a webserver and database engine. As any server 616–618 becomes unavailable, clients are automatically redirected to a matching backup server 621–623.

Although the invention is preferably described herein with reference to the preferred embodiment, one skilled in the art will readily appreciate that other architectures may be substituted for those set forth herein without departing from the spirit and scope of the present invention. Accordingly, the invention should only be limited by the claims included below.

The invention claimed is:

1. A client/server multi-user trade finance system for assisting vendors in providing trade finance information to finance intermediaries that have accounts receivable financing, comprising:
   a vendor-buyer manufacturer/trader/exporter and buyer information database, a credit limits information database, an accounts receivable payments and adjustments input system, an eligible invoice filter, a remittances manager, and a report generator;
   wherein one or more components of the trade finance system are programmed to perform operations comprising:
      responsive to one of the vendors entering an accounts receivable financing arrangement with a finance intermediary, providing real-time rule-checking of invoices according to predetermined rules pertaining to at least one of the following:
   financing specific limits, buyer limits, country limits;
      responsive to collections being received, freeing credit capacity for particular policies, buyers, and destination countries;
      transmitting representative remittances to financial entities.

2. An Internet-based trade finance automation system, comprising:
   an Internet server based on a database engine with a plurality of stored procedures and a data repository;
   a credit-limits database included in said data repository for providing certain accounts receivable financing limit information related to a particular pre-qualified buyer of a vendor;
   an invoice data entry system included as one of said stored procedures and that accesses the credit-limits database and flags an individual invoice to said particular pre-qualified buyer according to said accounts receivable financing limit information; and
   an accounts receivable database included in said data repository connected to receive said individual invoice;
   wherein, if said individual invoice in the accounts receivable database meets credit insurance policy/financing agreement criteria and is sold to or financed by a financial institution, the credit-limits database is automatically adjusted to reflect an open account to said particular pre-qualified buyer.

* * * * *